(12) United States Patent
Kim et al.

(10) Patent No.: US 8,566,003 B2
(45) Date of Patent: Oct. 22, 2013

(54) VEHICLE GENERATOR CONTROL SYSTEM AND METHOD FOR SAVING FUEL

(75) Inventors: Daekwang Kim, Hwaseong-si (KR); Minyoung Jung, Hwaseong-si (KR); Jiyong Yu, Pocheon-si (KR); Junyong Lee, Hwaseong-si (KR); Chikung Ahn, Hwaseong-si (KR); Hyungjun Kim, Hwaseong-si (KR)

(73) Assignee: Hyundai Motor Company, Seoul (KR)

( * ) Notice: Subject to any disclaimer, the term of this patent is extended or adjusted under 35 U.S.C. 154(b) by 90 days.

(21) Appl. No.: 13/300,285

(22) Filed: Nov. 18, 2011

(65) Prior Publication Data
US 2013/0054111 A1   Feb. 28, 2013

(30) Foreign Application Priority Data

Aug. 24, 2011   (KR) .......................... 10-2011-0084497

(51) Int. Cl.
*B60W 10/08* (2006.01)
(52) U.S. Cl.
USPC .................... 701/102; 180/65.285; 290/40 C
(58) Field of Classification Search
USPC .................... 701/102; 180/65.285; 290/40 C
See application file for complete search history.

(56) References Cited

U.S. PATENT DOCUMENTS

| | | |
|---|---|---|
| 5,266,836 A | 11/1993 | Sousa |
| 2001/0037645 A1* | 11/2001 | Morimoto et al. ............. 60/698 |
| 2004/0069546 A1* | 4/2004 | Lou et al. ..................... 180/65.2 |
| 2007/0181356 A1* | 8/2007 | Ando et al. ................... 180/65.4 |
| 2009/0131215 A1* | 5/2009 | Shamoto .......................... 477/3 |

FOREIGN PATENT DOCUMENTS

| | | |
|---|---|---|
| JP | 58012501 A | 1/1983 |
| JP | 8168103 A | 6/1996 |
| JP | 2003-224935 A | 8/2003 |
| JP | 2004180461 A | 6/2004 |
| JP | 2005063682 A | 3/2005 |
| JP | 2005-110339 A | 4/2005 |
| JP | 2007-244007 A | 9/2007 |
| JP | 2007223386 A | 9/2007 |
| KR | 1019990027631 A | 4/1999 |
| KR | 1020030065289 A | 8/2003 |
| KR | 1020080016232 A | 2/2008 |
| KR | 1020090050247 A | 5/2009 |
| KR | 1020100017027 A | 2/2010 |
| KR | 1020100063921 A | 6/2010 |
| KR | 1020100064067 A | 6/2010 |

* cited by examiner

*Primary Examiner* — Erick Solis
(74) *Attorney, Agent, or Firm* — Morgan, Lewis & Bockius LLP

(57) ABSTRACT

A vehicle generation controlling system for saving fuel includes a battery supplying power to electric components of a vehicle, a generator generating power by using rotational force of an engine and supplying the generated power to the battery and the electric components, and an ECU determining whether generation control is prevented by monitoring vehicle information on the vehicle and operational information on an operation of an electric product of a cooling system among the electric components and controlling the generator to prevent the generation control according to the determination. As a result, the generation control is performed based on whether an electric product of a cooling system is actuated and vehicle information on the vehicle to thereby prevent cooling performance from being deteriorated due to the generation control.

4 Claims, 12 Drawing Sheets

FIG.3B (Prior Art)

COOLING SYSTEM ELECTRIC PRODUCT IS ACTUATED

COOLING SYSTEM ELECTRIC PRODUCT
On
Off

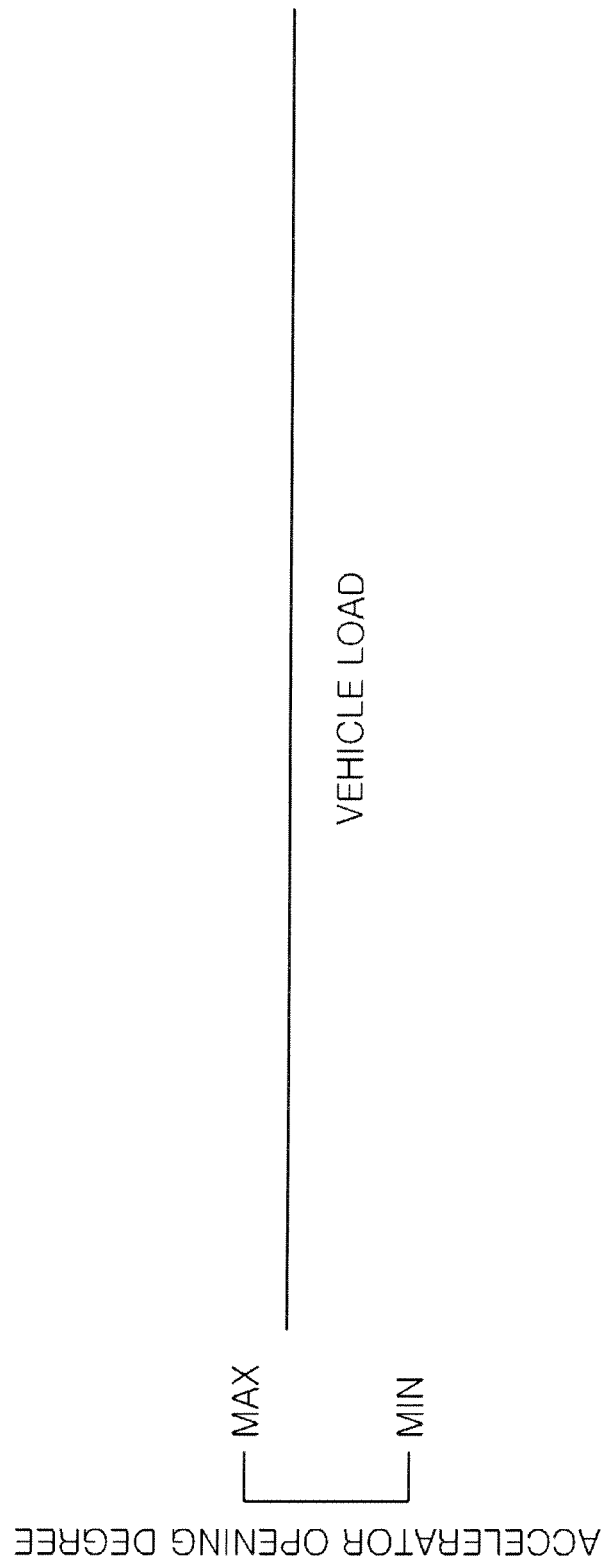

FIG.4B

COOLING SYSTEM ELECTRIC PRODUCT IS ACTUATED

COOLING SYSTEM ELECTRIC PRODUCT
On — Off

VEHICLE GENERATOR CONTROL SYSTEM AND METHOD FOR SAVING FUEL

CROSS-REFERENCE TO RELATED APPLICATIONS

The present application claims priority to Korean Patent Application Number 10-2011-0084497 filed Aug. 24, 2011, the entire contents of which application is incorporated herein for all purposes by this reference.

BACKGROUND OF INVENTION

1. Field of Invention

The present invention relates to a vehicle generation controlling system and a control method of the same, more particularly, a vehicle generation controlling system controlling a generator for saving fuel and a control method of the same.

2. Description of Related Art

A vehicle generation controlling system adopted in a vehicle as one of technologies for improving fuel efficiency performs regenerative generation in a deceleration driving section of the vehicle and uses power acquired therethrough in a non-deceleration section to reduce a load of a generator and improve fuel efficiency.

However, generation controlling adopted in the vehicle generation controlling system in the related art is generally performed without appropriately considering whether electric components of the vehicle are actuated to influence the performances of various electric components of the vehicle.

In particular, the cooling performance of an electric product of a cooling system of the vehicle deteriorates when generation voltage is maintained to be low due to the generation controlling adopted in the vehicle generation controlling system in the related art. That is, when the load of the vehicle is large while the vehicle is driven at a low speed, large cooling is required, but the power of the electric product of the cooling system is reduced by performing the generation controlling, and as a result, the temperature of cooling water increases.

The generation controlling system in the related art is described in Korean Patent Application Laid-Open No. 10-2010-0063921.

The information disclosed in this Background of the Invention section is only for enhancement of understanding of the general background of the invention and should not be taken as an acknowledgement or any form of suggestion that this information forms the prior art already known to a person skilled in the art.

SUMMARY OF INVENTION

The present invention has been made in an effort to provide a vehicle generation controlling system and a control method of the same that can solve a problem in that the temperature of cooling water increases by preventing the performance of an electric product of a cooling system from being deteriorated through limiting generation controlling for improving fuel efficiency when large cooling is required for a vehicle.

Various aspects of the present invention provide for a vehicle generation controlling system for saving fuel, including a battery supplying power to electric components of a vehicle, a generator generating power by using rotational force of an engine and supplying the generated power to the battery and the electric components, and an ECU determining whether generation control is prevented by monitoring vehicle information on the vehicle and operational information on an operation of an electric product of a cooling system among the electric components and controlling the generator to prevent the generation control according to the determination.

The ECU may determine that the generation control is prevented when judging that the electric product of cooling system is in operation through the operational information and judging that a value of the temperature of cooling water, a value of the opening degree of an accelerator, and a value of a vehicle speed in the vehicle information are larger than a set value of the cooling water temperature, a set value of the accelerator opening degree, and a set value of the vehicle speed, respectively.

Various aspects of the present invention provide for a control method of a vehicle generation controlling system with an ECU performing generation control for saving fuel by interworking with a battery and a generator connected with electric components of a vehicle, the method including judging, by the ECU, whether an electric product of a cooling system among the electric components is in operation after an engine of the vehicle starts, judging, by the ECU, whether a value of the temperature of cooling water in vehicle information monitored from the outside is larger than a predetermined set value of the cooling water temperature when judging the electric product of the cooling system is in operation, judging, by the ECU, whether a value of the opening degree of an accelerator in the vehicle information is larger than a predetermined set value of the accelerator opening degree when judging that the value of the cooling water temperature is larger than the set value of the cooling water temperature, judging, by the ECU, whether a value of a vehicle speed in the vehicle information is larger than a predetermined set value of the vehicle speed when judging the value of the accelerator opening degree is larger than the set value of the accelerator opening degree, and controlling, by the ECU, the generator to prevent the generation control when judging the value of the vehicle speed is larger than the set value of the vehicle speed.

According to various aspects of the present invention, generation control is performed based on whether an electric product of a cooling system is actuated and vehicle information including the temperature of cooling water, an opening degree of an accelerator, and a vehicle speed to thereby prevent cooling performance from being deteriorated due to the generation control.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIGS. 3A-3E are graphs showing a result by generation controlling in the related art.

FIGS. 4A-4E are graphs showing a result by generation controlling of an exemplary vehicle generation controlling system according to the present invention.

Figure 1:
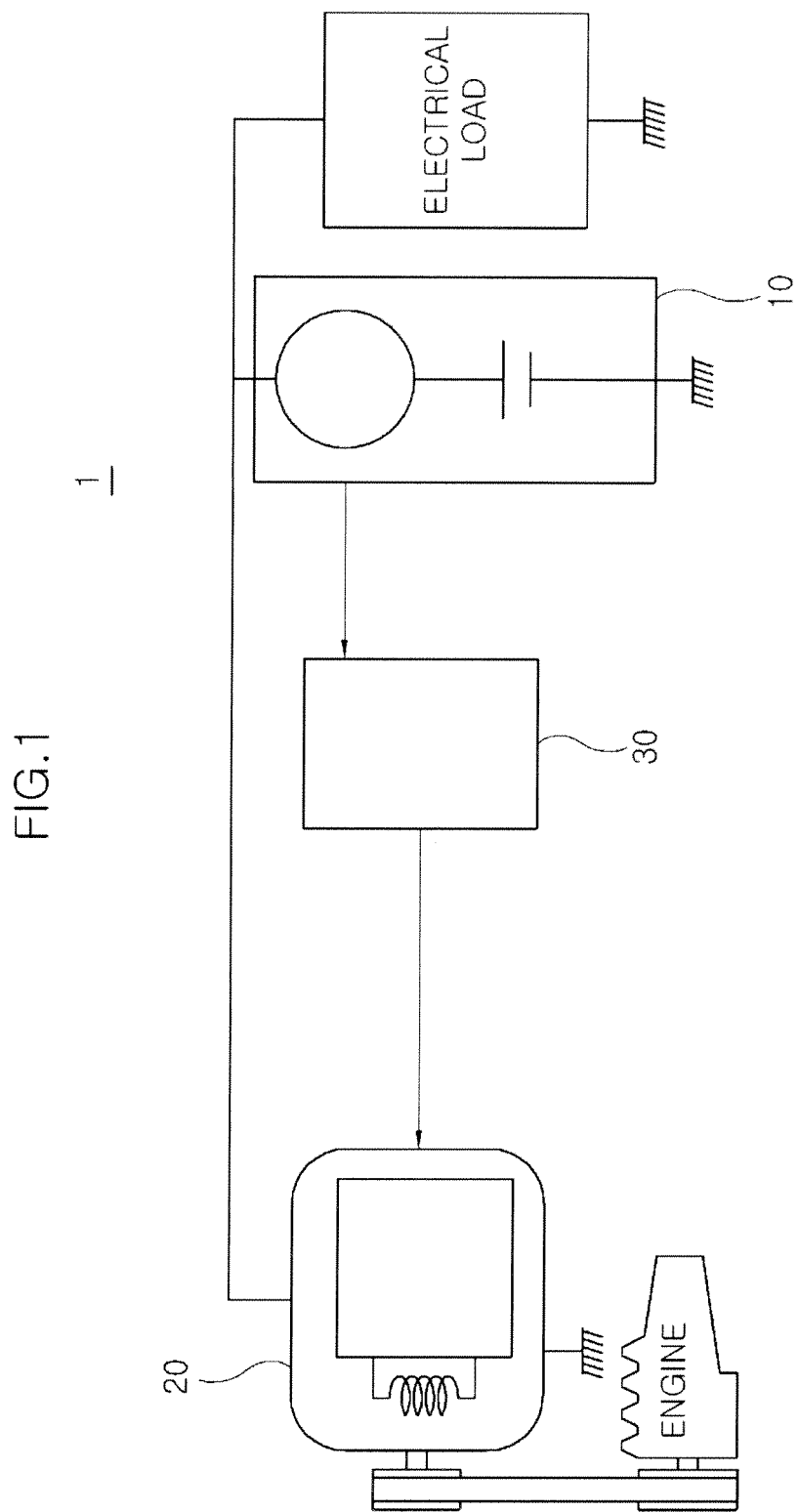
FIG. 1 is a block diagram of an exemplary vehicle generation controlling system according to the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Referring to FIG. 1, a vehicle generation controlling system 1 according to various embodiments includes a battery 10, a generator 20, and an ECU 30. ECU 30 is an abbreviation of an electronic control unit and performs overall control according to various embodiments.

Battery 10 is connected to generator 20 and various electric loads of the vehicle. Battery 10 is charged by receiving power from generator 20 and transmits battery information such as a state of charge (SOC) and the temperature of the battery to ECU 30.

Battery 10 provides power to various electric loads including electric components of cooling system through control by ECU 30. The electric components of cooling system mean a cooling fan, an electromotive water pump, an electromotive air-conditioner compressor, and the like.

Generator 20 generates power by using the rotation of an engine and a generation capacity of generator 20 is controlled by control by ECU 30. Generator 20 makes power generated by control by ECU 30 into constant voltage and outputs the constant voltage to battery 10 and the electric loads.

ECU 30 controls generator 20 by a generation control logic incorporated in advance by using vehicle information monitored from the engine, generator 20, battery 10, and the like and information on whether the electric components of the vehicle are actuated, which is inputted from the outside.

The vehicle information means the battery temperature that is sensed in battery 10 and transferred to ECU 30, and a vehicle speed, an opening degree of an accelerator, and the temperature of cooling water regarding a driving state and a traveling state of the vehicle, which is sensed in the engine and transferred to ECU 30.

Figure 2:
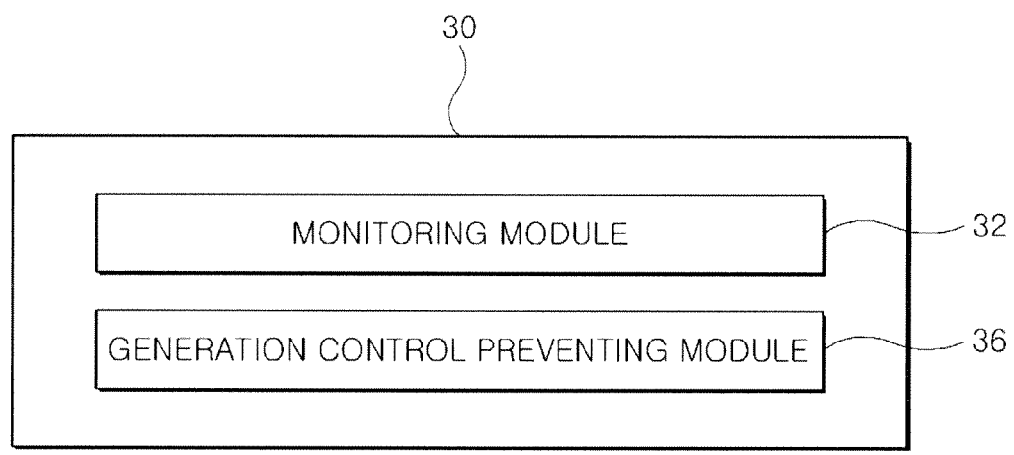
FIG. 2 is a functional block diagram exemplary engine control unit (ECU) according to the present invention.

Referring to FIG. 2, ECU 30 may be divided into a monitoring module 32 and a generation control preventing module 36 as shown in FIG. 2. Herein, the generation control logic associated with various embodiments will be primarily described and a general generation control logic in the related art will not be described.

Monitoring module 32 monitors the vehicle information transferred from the engine and battery 10 that interwork with ECU 30 and operational information on an operation of the electric product of the cooling system among the electric components of the vehicle, and transfers the monitored information to generation control preventing module 36.

Generation control preventing module 36 receives the vehicle information and the operation information that are monitored by monitoring module 32 to determine whether the generation control is prevented and prevent the generation control according to the determination. That is, generation control preventing module 36 controls generator 20 to prevent the generation control.

Specifically, generation control preventing module 36 judges whether four conditions described below are satisfied by using the monitored vehicle information and operational information to determine whether the generation control is prevented.

In a first condition, the electric product of the cooling system is in operation while the engine of the vehicle is actuated, in a second condition, a value of the cooling water temperature in the vehicle information is larger than a predetermined set value of cooling water temperature, in a third condition, a value of the accelerator opening degree in the vehicle information is larger than a set value of the accelerator opening degree, and in a fourth condition, a value of the vehicle speed in the collected information is larger than a set value of the vehicle speed. Generation control preventing module 36 may determine the preventing of the generation control when all the four conditions are sequentially satisfied.

Generation control preventing module 36 prevents the generation control after a time as long as a set value of a delay time by using a counter without preventing the generation control immediately when the generation control preventing module 36 judges that all the four conditions are satisfied.

Generation control preventing module 36 performs the generation control to maintain fixed voltage without changing voltage by using the temperature value of the battery collected from battery 10 in the vehicle information.

Hereinafter, an effect by generation control preventing module 36 will be described by comparing FIGS. 3 and 4. FIG. 3 is a graph showing a result by the generation control in the related art and FIG. 4 is a graph showing a result by generation controlling of a vehicle generation controlling system according to various embodiments of the present invention.

Figure 3A:
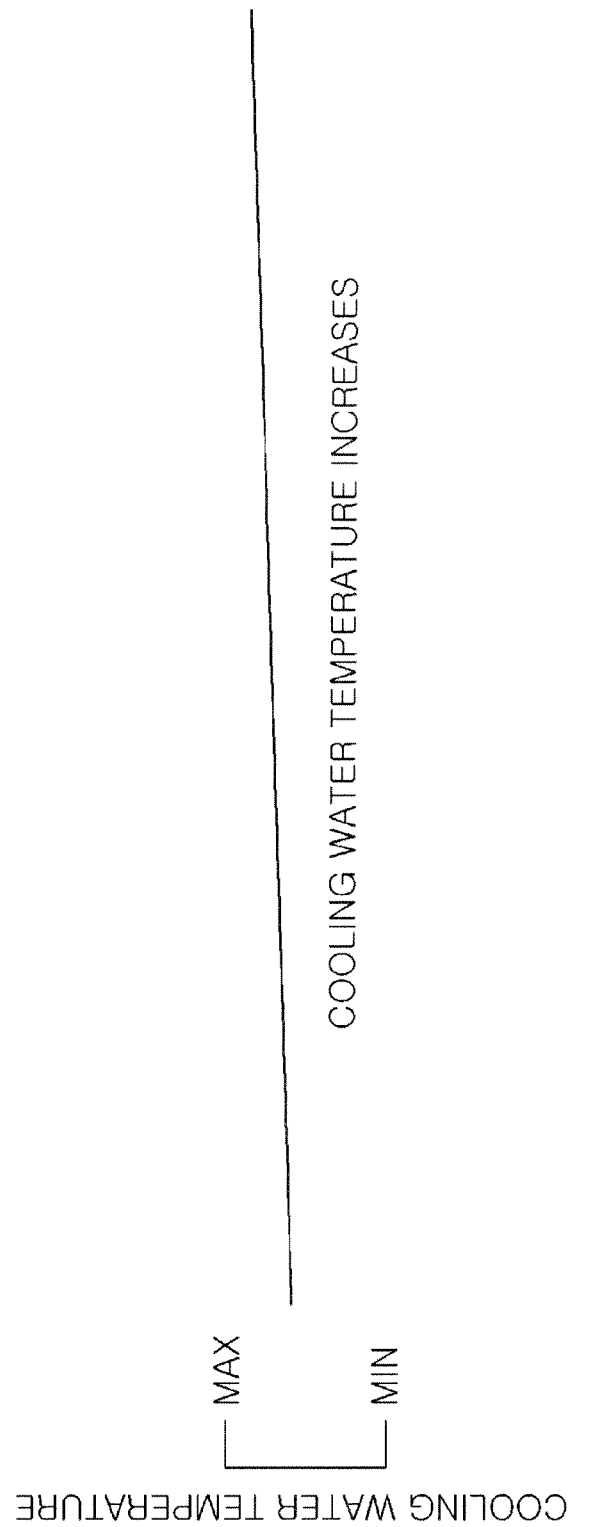
Figure 3D:
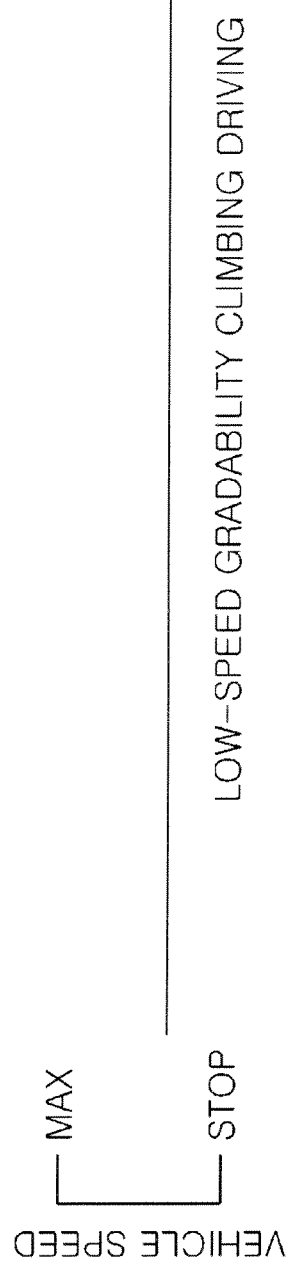
Figure 4A:
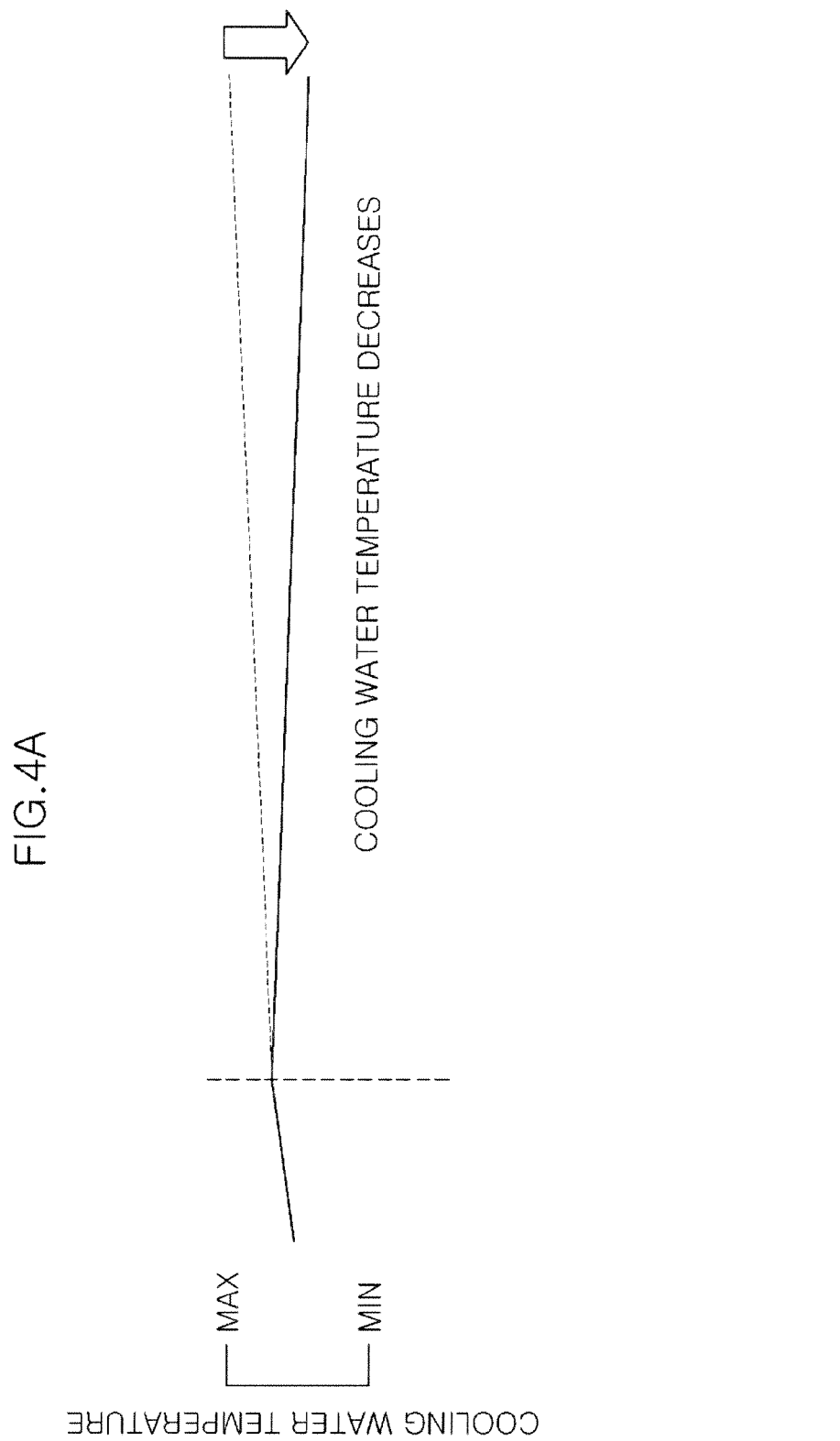
Figure 4C:
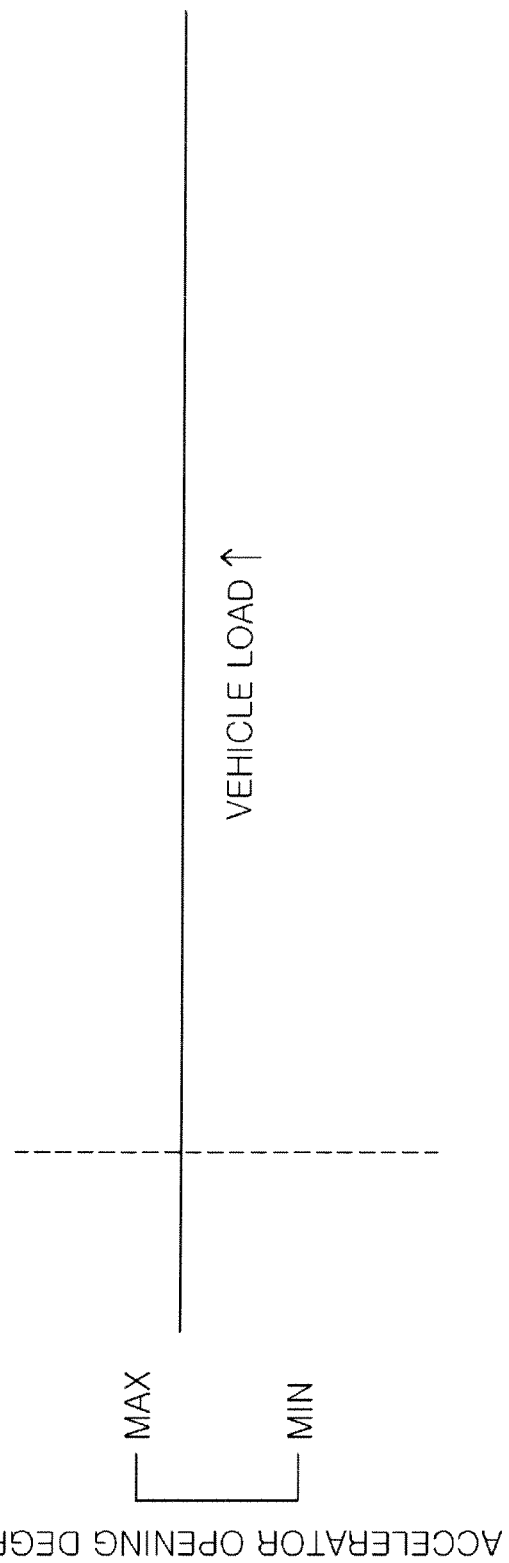

Generation control preventing module 36 may decrease the cooling water temperature as shown in the graph shown in FIG. 4A unlike the graph shown in FIG. 3A when a large load is applied as shown in FIGS. 3C and 4C and the electric product of the cooling system operates as shown in FIGS. 3B and 4B, to a vehicle which is driven at a low speed as shown in FIGS. 3D and 4D.

Figure 3E:
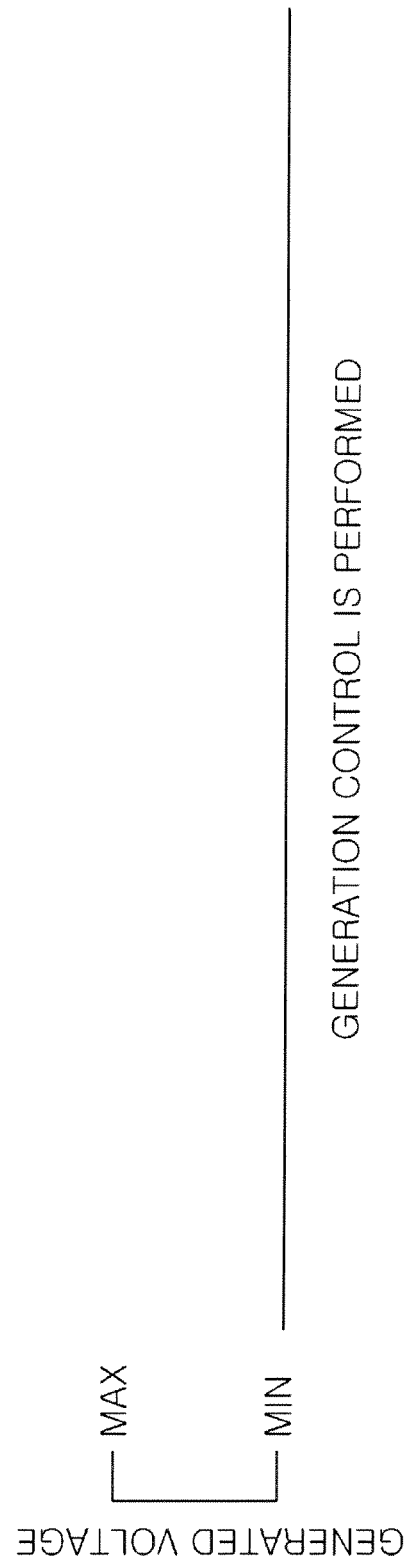

This is because generation control preventing module 36 according to various embodiments prevents the generation control as shown in the graph shown in FIG. 4E unlike the graph shown in FIG. 3E.

Figure 5:
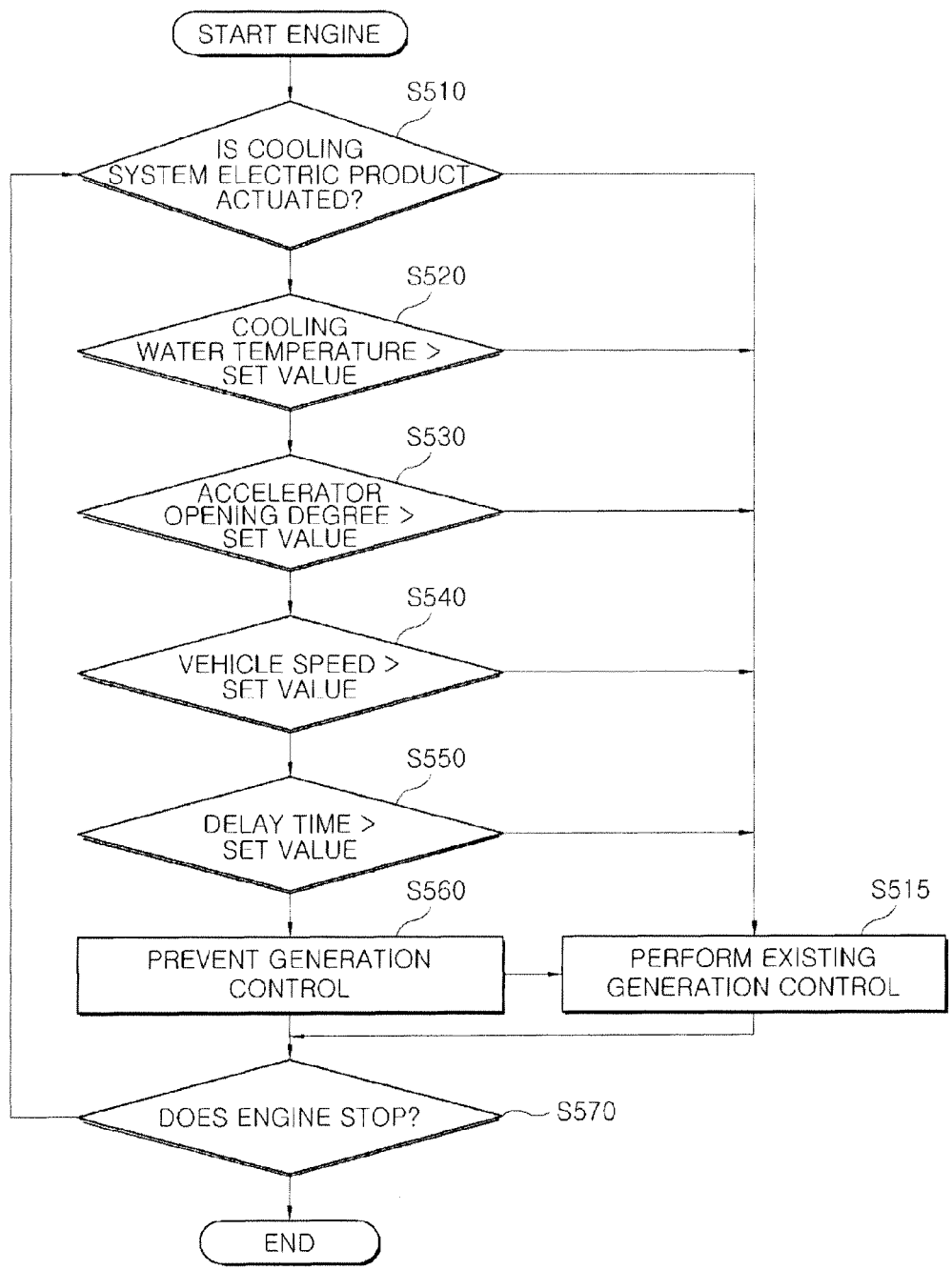
FIG. 5 is a control procedure diagram of an exemplary vehicle generation controlling system according to the present invention.

Referring to FIG. 5, an operation of a vehicle generation controlling system 1 according to various embodiments of the present invention will be described. An ECU 30 judges whether an electric product of a cooling system among electric components of a vehicle is in operation after an engine is operated (S510) to perform an existing generation control logic when the electric product of cooling system is not operated (S515).

According to a judgment result in step S510, when the electric product of cooling system is operated, ECU 30 judges whether the cooling water temperature is larger than a predetermined set value of cooling water temperature (S520) to perform the existing generation control logic in step S515 when the cooling water temperature is not larger than the set value of cooling water temperature.

According to a judgment result in step S520, when the cooling water temperature is larger than the set value of cooling water temperature, ECU 30 judges whether an accelerator opening degree is larger than a predetermined set value of the accelerator opening degree (S530) and performs the existing generation control logic in step S515 when the accelerator opening degree is not larger than the set value of the accelerator opening degree.

According to a judgment result in step S530, when the accelerator opening degree is larger than the set value of the accelerator opening degree, ECU 30 judges whether a vehicle speed is larger than a predetermined set value of the vehicle speed (S540) and performs the existing generation control logic in step S515 when the vehicle speed is not larger than the set value of the vehicle speed.

According to a judgment result in step S540, when the vehicle speed is larger than the set value of the vehicle speed, ECU 30 judges whether a delay time reaches a predetermined set value of the delay time (S550) and performs the existing generation control logic in step S515 when the delay time does not reach the set value of the delay time.

According to a judgment result in step S550, ECU 30 prevents the generation control when the delay time reaches the set value of the delay time (S560). In addition, it is judged whether the engine stops (S570) and when the engine does not stop, the process returns to S510 to continuously perform the control procedure, while when the engine stops, the control procedure ends.

As a result, vehicle generation controlling system 1 according to various embodiments of the present invention performs the generation control based on whether the electric product of cooling system is actuated and the vehicle information such as the cooling water temperature, the accelerator opening degree, and the vehicle speed to minimize the deterioration of the cooling performance caused due to the generation control.

Vehicle generation controlling system 1 according to various embodiments can be widely applied to all vehicles including hybrid vehicles and electric vehicles without a limit in addition to general vehicles.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A vehicle generation controlling system, comprising:
   a battery supplying power to electric components of a vehicle;
   a generator generating power by using rotational force of an engine and supplying the generated power to the battery and the electric components; and
   an engine control unit (ECU) determining whether generation control is prevented by monitoring vehicle information on the vehicle and operational information on an operation of an electric product of a cooling system among the electric components and controlling the generator to prevent the generation control according to the determination;
   wherein the ECU monitors a battery temperature value sensed in the battery and performs the generation control to maintain fixed voltage without changing voltage by using the monitored battery temperature value to prevent the generation control; and
   wherein when the ECU determines that the generation control is prevented, the ECU stands by for a time as long as a predetermined set value of a delay time before preventing the generation control according to the determination.

2. The vehicle generation controlling system as defined in claim 1, wherein the ECU determines that the generation control is prevented when judging that the electric product of the cooling system is in operation through the operational information and judging that a value of the temperature of cooling water, a value of the opening degree of an accelerator, and a value of a vehicle speed in the vehicle information are larger than a set value of the cooling water temperature, a set value of the accelerator opening degree, and a set value of the vehicle speed, respectively.

3. The vehicle generation controlling system as defined in claim 1, wherein the electric product of the cooling system is any one product or two or more components of a cooling fan, an electromotive water pump, and an electromotive air-conditioner compressor.

4. A control method of a vehicle generation controlling system with an engine control unit (ECU) performing generation control for saving fuel by interworking with a battery and a generator connected with electric components of a vehicle, the method comprising:
   judging, by the ECU, whether an electric product of a cooling system among the electric components is in operation after an engine of the vehicle starts;
   judging, by the ECU, whether a value of the temperature of cooling water in vehicle information monitored from the outside is larger than a predetermined set value of the cooling water temperature when judging the electric product of the cooling system is in operation;
   judging, by the ECU, whether a value of the opening degree of an accelerator in the vehicle information is larger than a predetermined set value of the accelerator opening degree when judging that the value of the cooling water temperature is larger than the set value of the cooling water temperature;
   judging, by the ECU, whether a value of a vehicle speed in the vehicle information is larger than a predetermined set value of the vehicle speed when judging the value of the accelerator opening degree is larger than the set value of the accelerator opening degree vehicle speed; and
   controlling, by the ECU, the generator to prevent the generation control when judging the value of the vehicle speed is larger than the set value of the vehicle speed;
   wherein the ECU monitors a battery temperature value sensed in the battery and performs the generation control to maintain fixed voltage without changing voltage by using the monitored battery temperature value to prevent the generation control; and
   wherein the preventing of the generation control includes standing, by the ECU, for a time as long as a predetermined set value of a delay time before preventing the generation control after judging that the value of the vehicle speed is larger than the set value of the vehicle speed.

* * * * *